Figure 1:
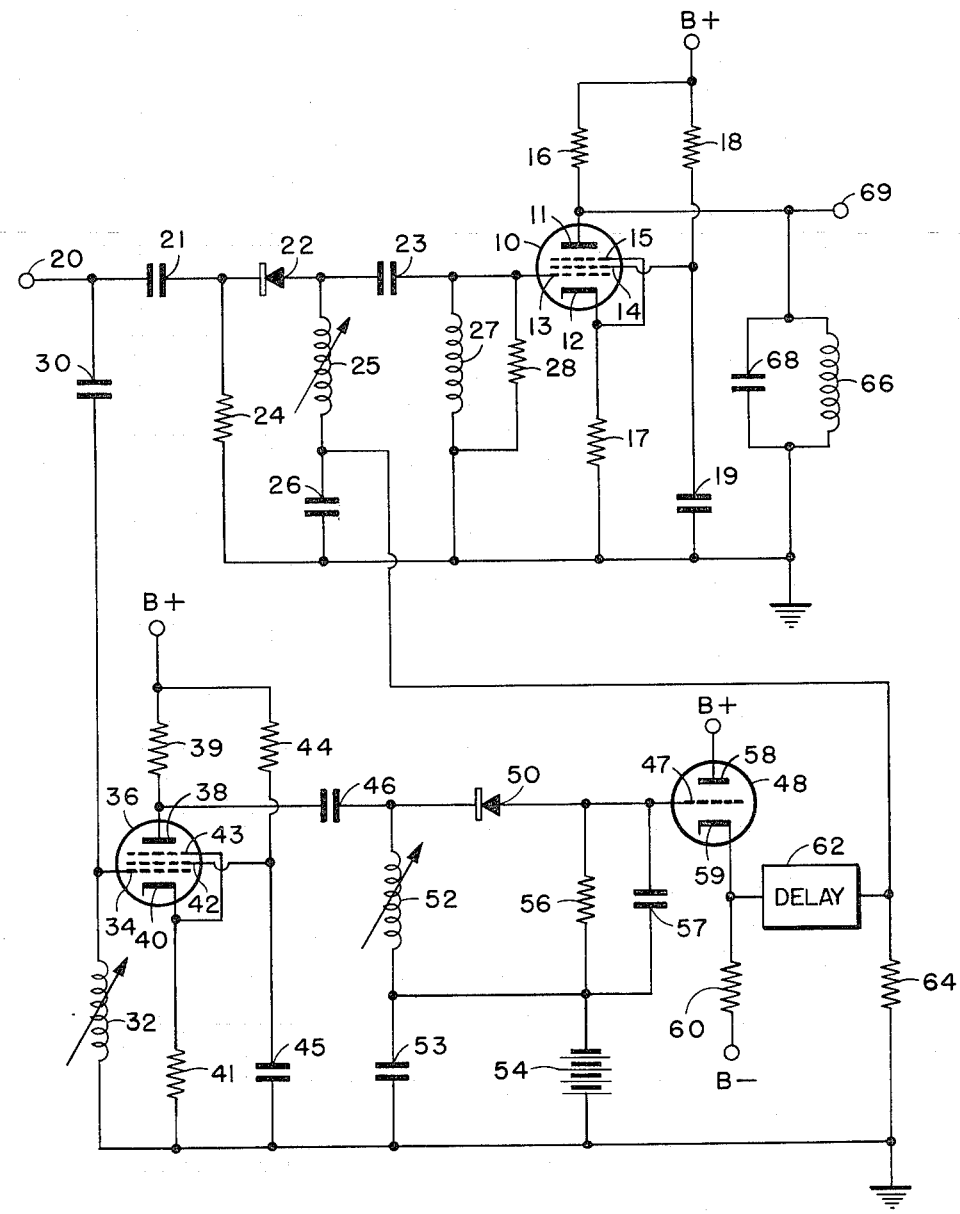

June 25, 1963  R. E. CARSON ETAL  3,095,540
INTERMEDIATE FREQUENCY BALANCE BIAS SYSTEM
Filed Nov. 17, 1960  2 Sheets-Sheet 1

INVENTORS.
WAYNE C. JOHNSON.
ROBERT E. CARSON.
BY Alden D. Redfield
Irwin P. Garfinkle
ATTORNEYS.

3,095,540
INTERMEDIATE FREQUENCY BALANCE BIAS SYSTEM
Robert E. Carson, Levittown, Pa., and Wayne C. Johnson, Cincinnati, Ohio, assignors to Avco Corporation, Cincinnati, Ohio, a corporation of Delaware
Filed Nov. 17, 1960, Ser. No. 69,886
6 Claims. (Cl. 325—323)

This invention relates to an anti-jamming technique for use with radar systems and, more particularly, to a system for providing a radar receiver with the ability to detect a target in the presence of on-frequency continuous wave and long pulse jamming.

It is well known in the art that strong continuous wave or long pulse jamming signals can saturate a radar receiver and thereby prevent the detection of target return signals. The two most common anti-jamming methods in use in modern radars include such techniques as Instantaneous Automatic Gain Control (IAGC) and Detector Balanced Bias (DBB), but these techniques have limitations which this invention overcomes.

Conventional AGC will operate to prevent receiver saturation by reducing received gain in the presence of a jamming signal, but is undesirable since the reflected target signal is reduced in the same proportion as the jamming signal and, therefore, there is a considerable loss of desired signal. IAGC overcomes the foregoing limitation and has proved very effective in preventing saturation in the intermediate frequency stages of the receiver, but this system depends for its operation on a closed feedback loop from the video detector. This means that in the feedback path the R-C constants must be critically adjusted so as to avoid instability. This means that only a relatively slow-acting system is possible, and there is a tendency to deteriorate target return signals. DBB systems have also proved effective in reducing the effects of jamming, but in these systems the jamming signal reduction is accomplished in the detector stage and, therefore, jamming signals as well as target return signals are amplified in the intermediate frequency stages, and saturation of the intermediate frequency stages is not prevented.

The Intermediate Frequency Balanced Bias (IFBB) system which constitutes this invention provides the advantages of the prior art systems, but eliminates many of the various disadvantages. That is to say, this invention provides a balanced bias in the intermediate frequency stages without proportionate reduction of the target return signal. Since the foregoing result is accomplished by using a "feed forward" system of bias, the use of a relatively long delay period is permitted, thereby allowing very rapid action to avoid deterioration of target return signals. Moreover, since this invention provides for anti-jamming techniques prior to the detector stage, amplification of jamming signals in the intermediate frequency stages may be substantially eliminated.

An object of this invention is to provide simple circuitry for a radar receiver to accomplish desired signal reception in an environment of normally saturated countermeasures action or interference.

Another object of this invention is to provide an intermediate frequency balanced bias system for anti-jamming whereby a constant gain is presented to target return signals and a lower gain is automatically presented to jamming signals, the ratio of the gain to the jamming signals being inversely proportional to the magnitude of the jamming signals.

Still another object of this invention is to provide an intermediate frequency signal path comprising a diode which is backbiased by a direct voltage proportional to the magnitude of the jamming signal at the intermediate frequency, the direct voltage being applied through a relatively long time delay line to permit the passage of target return signals.

Figure 2:
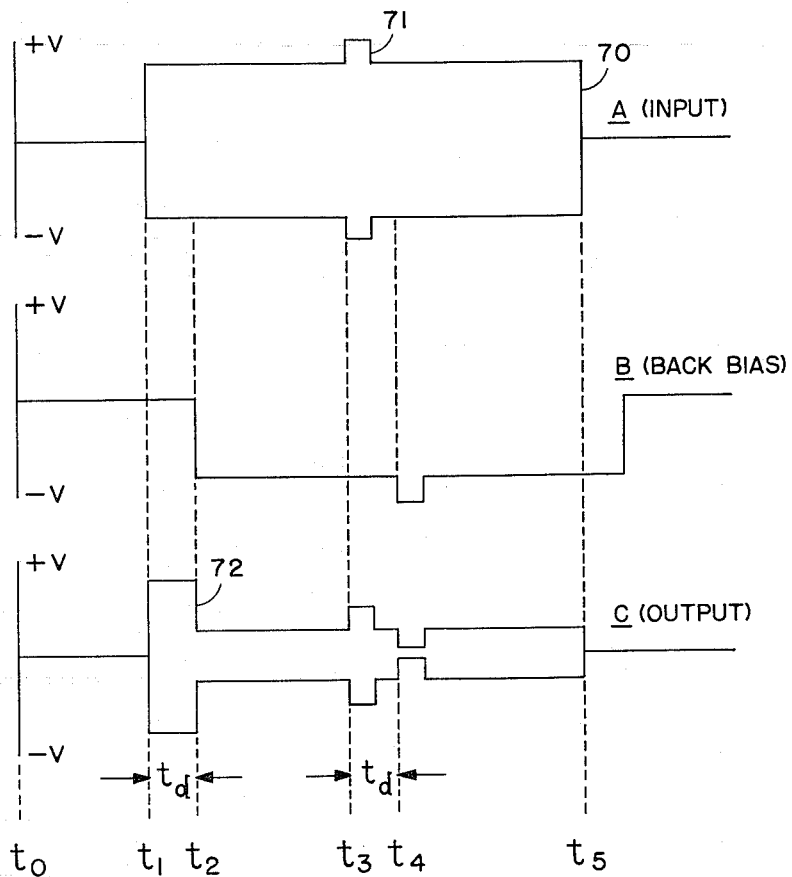

For further objects and for a better understanding of the precise nature of this invention, reference should now be made to the following detailed specification and to the accompanying drawing in which:

FIG. 1 is a circuit diagram illustrating a preferred form of this invention; and
FIG. 2 is a series of curves illustrating the performance of the invention.

Briefly described, a detector or rectifier is connected in the input of one or more of the intermediate frequency stages of a radar receiver. Received energy, which includes both jamming signals and reflected target return signals, are converted to a direct voltage which is then applied to a delay line. The delayed direct voltage is then used to backbias the diode to prevent or reduce conduction through the diode. That is to say, the backbias applied to the diode is such that the continuous wave amplitude between target returns is mostly in the cutoff region of the diode. Upon reception of a target return signal, this signal is added to the jamming signal for a resultant peak which is in the forward conduction region of the diode. The delay line line prevents the diode from responding in time to cut off the narrow pulse target return. Thus, all jamming pulses of width greater than the delay line time will be limited to this time, while shorter pulses will keep their identity. The jamming pulses can be removed subsequently by a pulse width discriminator.

Referring now to FIG. 1 of the drawing, there is illustrated a single stage of an intermediate frequency amplifier comprising a pentode 10 having a plate 11, a cathode 12, a control grid 13, a screen grid 14, and a suppressor grid 15. Bias for the pentode 10 is provided by connecting the plate 11 to a B+ supply through a plate resistor 16, and by connecting the cathode 12 to ground through a cathode resistor 17. The suppressor grid is conventionally connected to the cathode, and the screen grid 14 is biased from the B+ supply through resistor 18, the condenser 19 providing an alternating current path to ground.

Input signals appearing at the input terminal 20 may contain on-frequency jamming signals which, if applied directly to the control grid 13 of the pentode 10, would saturate this stage of amplification and, therefore, the presence of target return signals would be completely undetected. In order to reduce the ratio of the jamming signals relative to the target return signals, the intermediate frequency signals are applied to the grid 13 through a series-connected condenser 21, a diode 22, and a D.C. blocking condenser 23, the diode 22 being back biased in a manner described below with a signal proportional to the magnitude of the intermediate frequency signal at input terminal 20. A resistor 24 is connected between the cathode of the diode 22 and ground to provide a direct current path for the diode. A high impedance variable inductor 25 for tuning the distributed capacity input of pentode 10 is connected to ground through an intermediate frequency bypass condenser 26. To insure against blocking due to grid currents flowing during overload conditions and thus providing a rapid recovery when the overload is removed, and to limit circuit Q and thus maintain a broad receiver bandwidth, a parallel-connected inductor 27 and a resistor 28 are connected between the control grid 13 and ground. The condenser 23 prevents the diode back bias from reaching the grid 13, and together with inductor 27 provides a high pass filter. The resistor 28 also provides the required load for the diode 22.

Back bias for the diode 22 is accomplished by coupling part of the input signal through condenser 30 to control grid 34 of a pentode 36. Variable inductor 32 is provided for tuning out distributed capacities of the input generator and to furnish a return path for control grid 34 to ground. Plate bias for the plate 38 is provided from the B+ supply through plate resistor 39, while the cathode 40 is connected to ground through cathode resistor 41. Suppressor grid 43 is conventionally connected to the cathode while screen grid 42 is provided with an appropriate bias by means of a resistor 44, an A.C. path to ground being provided by a condenser 45.

The output voltage at the plate 38 is coupled via a condenser 46 through a diode 50 to the grid 47 of a triode 48. An inductor 52, which is connected from the cathode of diode 50 to ground through a bypass condenser 53, tunes the distributed output capacity of the pentode 36 and the capacity of the diode 50 to the intermediate frequency. A negative bias is applied to the control grid 47 of the triode 48 through a resistor 56 to bias the triode 48 into conduction at a predetermined level. A condenser 57 is connected across resistor 56 for filtering out residual intermediate frequency components.

The direct voltage signals appearing at the output of the diode 50 are then power-amplified in the triode 48, the plate 58 of which is biased from the B+ supply, the cathode 59 being connected to the B− supply through a cathode follower resistor 60. The cathode follower output is then applied to a time delay line 62, and a delayed direct voltage is thus developed across resistor 64. This delayed direct voltage is then applied from the resistor 64 to the anode of the diode 22 through the variable inductor 26 to drive the anode of the diode 22 negative and, therefore, into cutoff by an amount proportional to the voltage on resistor 64.

Note that in the absence of an intermediate frequency signal the bias on the grid of the triode 47 provided by the battery 54 results in a positive voltage across resistor 64 which introduces a forward bias on the diode 22. Thus, relatively small interference signals, such as receiver noise, will be permitted to pass through the diode 22 with negligible attenuation. On the other hand, introduction of large jamming signals will drive down the voltage on resistor 64 and establish a back bias on diode 22. Conduction through the diode 22 will then not result until the forward bias is increased by a desired intelligence signal which is permitted to pass through to the grid 13 of the pentode 10. To insure signal restoration the output at the plate 11 is then applied across a high impedance tank, including an inductor 66 and a condenser 68 tuned to the desired signal frequency. The signals appearing at the output terminal 69 are further processed by techniques not forming a part of this invention.

The operation of the invention may be best understood by reference to the curves of FIG. 2 in which curves A and C represent the envelopes of the input and output signals, respectively, appearing at the diode 22, and the curve B represents the direct current back bias voltage applied at the anode of diode 22. In curve A the jamming signal envelope is indicated at 70 while the target return signal is represented by a short duration pulse at 71 which adds to the jamming signal. It is to be understood that the relationships between the jamming and target return signals have been chosen arbitrarily for the purposes of this discussion and any relationship may, in fact, exist; and the envelope of both the jamming and target return signals may take various shapes.

When at time $t_1$ the on-frequency jamming signal, as shown at 70 in curve A, is applied to the input terminal 20, this signal will simultaneously be applied through the condensers 21 and 30 to the inputs of the diode 22 and the pentode 36, respectively. That portion of the jamming signal applied directly to the diode 22 elevates the potential of the cathode of the diode 22 to cause immediate conduction. On the other hand, that portion of the jamming signal which is applied to the pentode 36 will subsequently be applied to the anode of the diode 22 after a given time delay to cause the diode 22 to cut off or reduce conduction. That is to say, that portion of the jamming signal which is applied to the pentode 36 is amplified and then detected in the diode 50, the A.C. components being removed by means of the filters consisting of the elements 52, 53, 56, and 57. The D.C. output from diode 50 is then applied to the triode 48, the cathode follower output of which is impressed across resistor 64 after passing through the time delay line 62. In actual practice the time delay line 62 is arranged to provide a time delay equal to approximately twice the time of the target return signal.

Thus, as shown in curve B, a voltage directly proportional to the jamming signal is developed across the resistor 64 at a time $t_2 = t_1 + t_d$, $t_d$ being the period of delay of delay line 62. Therefore, as shown in curve C, the diode 22 will be biased into conduction by the jamming signal for a period $t_d$ but will be cut off, or at least substantially reduced in conductivity at time $t_2$.

When at time $t_3$ the target return signal appears at the input of the diode 22, it will be permitted to pass directly through to the grid 13 since the back bias applied at the anode resulting from the target return signal 71 is delayed and does not develop until time $t_4$. At time $t_4$, diode conduction (curve C) will be reduced, but this will have no effect on the signal intelligence. As seen in the curve C, not all of the jamming signal is eliminated, a jamming pulse 72, having a fixed width equal to time $t_d$ remaining to pass through the system; however, in subsequent stages this portion of the jamming signal may be removed by an appropriate pulse width discriminator. Such a pulse width discriminator is described in a copending application of Bruck et al., Serial No. 827,958, entitled "Pulse Width Sensor" and assigned to the same assignee as this invention.

Therefore, it may be seen that the jamming signal, which may be either continuous wave or long pulse, is used to automatically defeat its intended purpose, and the system effectively eliminates or reduces the magnitude of the jamming signal without affecting the magnitude of the target return signal. That is to say, the enemy countermeasures action is used to initiate and effect the countermeasures action in the detection system. The simplicity and effectiveness of this invention are enhanced by its versatility, and it is readily adaptable to systems embodying other anti-jamming measures without degrading their performance.

For the purpose of assisting persons skilled in the art to construct an operative embodiment of this invention, the following circuit parameters used in a system actually reduced to practice are recited below. It is to be understood, however, that these parameters are merely typical and that variations are permissible, depending only upon the particular applications:

Condensers: μμf.
19 ---------------------------------------- 1000
21 ---------------------------------------- 30
23 ---------------------------------------- 1000
26 ---------------------------------------- 30
30 ---------------------------------------- 30
45 ---------------------------------------- 1000
46 ---------------------------------------- 1000
53 ---------------------------------------- 1000
57 ---------------------------------------- 20

Resistors:
16 ----------------------------------K ohms-- 2.7
17 ----------------------------------ohms-- 47
18 ----------------------------------K ohms-- 10
24 ----------------------------------ohms-- 220
28 ----------------------------------K ohms-- 4.7
39 ----------------------------------do---- 2.7
41 ----------------------------------ohms-- 47
44 ----------------------------------K ohms-- 10
56 ----------------------------------do---- 20
64 ----------------------------------do---- 1

Inductors: μh.
- 25 -------------------------------------- 2
- 27 -------------------------------------- 2
- 32 -------------------------------------- 2
- 52 -------------------------------------- 2

Vacuum Tubes: Type
- Diode 22 ----------------------------- IN251
- Diode 50 ----------------------------- IN251
- Triode 48 ---------------------------- 5703
- Pentode 10 --------------------------- 5702
- Pentode 36 --------------------------- 5702

While the time delay $t_d$ in the apparatus as reduced to practice was made equal to twice the duration of the intelligence signal, it is to be understood that other time delays may also be used. For example, the time delay of one-half the duration of the intelligence signal may be used, and this will be effective to still further reduce the energy of the jamming signals passing through to the intermediate frequency amplifier. However, the intelligence signals will also be reduced.

It should also be noted that while the invention is described in connection with the intermediate frequency stages of the radar receiver, it is equally well adapted to any radio frequency stage. Also, while the anti-jamming system disclosed may be used in each intermediate frequency stage, it was found that satisfactory operation resulted by use of such circuitry in every other stage.

It will be noted that the system imposes no limitation on the speed of the biasing action; that is to say, the slope of the back bias curve B may closely follow the slope of the envelope of the combined jamming and target return signals 70 and 71 (after the given time delay). On the other hand, a rapid action is not possible with IAGC since this requires a feedback loop and, therefore, the gain adjustment for stability is critical; and an attempt to produce the rapid action such as is represented by the curve B would result in oscillations at the operating frequencies. On the other hand, the Intermediate Frequency Balanced Bias System disclosed here does not have a closed feedback loop, thereby allowing freedom in adjustment of bias to jamming amplitude ratio.

Having thus described the invention, what is claimed is:

1. In a receiver, means for separating combined signals comprised of simultaneously received short duration intelligence signals and relatively long duration interference signals, the combination comprising: a signal processing stage having an input circuit; a variable impedance device, the impedance of which is variable in proportion to the magnitude of an applied direct voltage; means for coupling said combined signals to said input circuit through said variable impedance device; means coupled to said combined signals for producing a direct voltage proportional in magnitude to the magnitude of said combined signals; means for delaying said direct voltage for a predetermined period; and means for biasing said variable impedance device with said delayed direct voltage to increase the impedance thereof at the end of said period, whereby the duration of said interference signals will be reduced to the duration of said period.

2. The invention as defined in claim 1, wherein said predetermined period is longer than said short duration but less than said relatively long duration, whereby said intelligence signals will be substantially unaffected.

3. The invention as defined in claim 1, wherein said variable impedance means is a diode, and wherein said delayed direct voltage applies a back bias to said diode.

4. In a receiver at which intelligence signals of predetermined frequency and duration are received simultaneously with interference signals of said predetermined frequency and of relatively long duration, means for separating said intelligence signals and said interference signals without degrading said intelligence signals, the combination comprising: an amplifier for amplifying said intelligence and interference signals, said amplifier having an input circuit; a first diode; means coupling said intelligence and said interference signals to said input circuit through said first diode, said first diode being normally conductive in the presence of said intelligence or said interference signals; means for back biasing said first diode for decreasing conduction therethrough, said means comprising a second diode, said second diode being supplied with said intelligence and said interference signals; means for removing alternating current components from the output of said second diode to produce a direct voltage proportional to said intelligence and said interference signals; means for delaying said direct voltage for a period greater than the duration of said intelligence signals but less than the duration of said interference signals; and means connecting said direct voltage to said first diode for back biasing said first diode, whereby the duration of said interference signals is reduced to the period of the time delay, and said intelligence signals are permitted to pass through said valve to said input circuit without degradation.

5. In a radar receiver at which relatively long duration interference signals and relatively short duration target return signals are simultaneously received, the combination comprising: an amplifier stage for said receiver; an input circuit for said amplifier stage; a diode connected in said input circuit; means coupling said interference signals and said target return signals to said input circuit through said diode; means responsive to the combined magnitude of said interference signals and said target return signals for producing a direct voltage having a magnitude proportional to said combined magnitude; time delay means for delaying said direct voltage for a period greater than the duration of said target return signals but substantially less than the duration of said interference signals, said direct voltage being applied to said diode for back biasing said diode to reduce conduction therethrough at the end of said period, whereby the duration of said interference signal is reduced to the period of the time delay, and said target return signal is permitted to pass unaffected through said diode to said input circuit.

6. In a receiver at which intelligence signals of predetermined frequency and duration are received simultaneously with interference signals of said predetermined frequency and of relatively long duration, means for separating said interference signals and said intelligence signals without degrading said intelligence signals, the combination comprising: a signal amplifying stage having an input circuit; an electron valve; means coupling said interference signals and said intelligence signals to said input circuit through said electron valve; means responsive to the combined magnitudes of said interference signals and said intelligence signals for producing a direct voltage having a magnitude proportional to the combined magnitudes of said signals; means for delaying said direct voltage for a period greater than said predetermined duration but less than said long duration; and means coupling said delayed direct voltage to said electron valve for back biasing said electron valve to substantially reduce conduction therethrough at the end of said period, whereby the duration of said interference signals is reduced to the period of the time delay, and said intelligence signals are permitted to pass through said valve to said input circuit without degradation.

References Cited in the file of this patent

UNITED STATES PATENTS

| | | |
|---|---|---|
| 2,012,433 | Myers | Aug. 27, 1935 |
| 2,426,187 | Earp | Aug. 27, 1947 |
| 2,532,347 | Stodola | Dec. 5, 1950 |
| 2,552,232 | Sunstein | May 8, 1951 |